(12) United States Patent
Juni

(10) Patent No.: US 7,496,265 B2
(45) Date of Patent: Feb. 24, 2009

(54) LENS-EQUIPPED OPTICAL WAVEGUIDE DEVICE FOR TOUCH PANEL AND MANUFACTURING METHOD THEREOF

(75) Inventor: Noriyuki Juni, Ibaraki (JP)

(73) Assignee: Nitto Denko Corporation, Osaka (JP)

( * ) Notice: Subject to any disclaimer, the term of this patent is extended or adjusted under 35 U.S.C. 154(b) by 0 days.

(21) Appl. No.: 12/118,280

(22) Filed: May 9, 2008

(65) Prior Publication Data

US 2008/0279502 A1 Nov. 13, 2008

Related U.S. Application Data

(60) Provisional application No. 60/951,035, filed on Jul. 20, 2007.

(30) Foreign Application Priority Data

May 10, 2007 (JP) ............................. 2007-125974

(51) Int. Cl.
*G02B 6/10* (2006.01)
(52) U.S. Cl. ........................................ 385/129; 385/33
(58) Field of Classification Search ................ 385/32, 385/33, 129–132; 156/252
See application file for complete search history.

(56) References Cited

U.S. PATENT DOCUMENTS

| 5,764,833 A * | 6/1998 | Kakii et al. ................... 385/54 |
| 7,085,079 B2 * | 8/2006 | Okazaki ..................... 359/819 |
| 2003/0081930 A1 * | 5/2003 | Filhaber et al. ............. 385/147 |
| 2004/0201579 A1 | 10/2004 | Graham |
| 2004/0202477 A1 * | 10/2004 | Nagasaka et al. ........... 398/138 |
| 2005/0271326 A1 | 12/2005 | Luo |
| 2006/0239605 A1 * | 10/2006 | Palen et al. .................... 385/14 |
| 2008/0111796 A1 * | 5/2008 | Atkins et al. ................. 345/175 |
| 2008/0159694 A1 * | 7/2008 | Payne .......................... 385/33 |
| 2008/0226230 A1 * | 9/2008 | Kuroda et al. ................. 385/33 |

FOREIGN PATENT DOCUMENTS

| JP | 2000078349 A | 3/2000 |
| JP | 2008233556 | * 3/2007 |
| WO | WO 2007/048180 A1 | 5/2007 |

OTHER PUBLICATIONS

European Search Report dated Jul. 17, 2008, issued in corresponding European Patent Application No. 08007845.

* cited by examiner

*Primary Examiner*—Ellen Kim
(74) *Attorney, Agent, or Firm*—Westerman, Hattori, Daniels & Adrian, LLP.

(57) ABSTRACT

A lens-equipped optical waveguide device for a touch panel comprises an optical waveguide including an under cladding layer and a plurality of cores; and a lens device having a mounting surface for placing the optical waveguide thereon and a lens formed in an end portion of the mounting surface. The mounting surface of the lens device includes an adhesive receiving groove formed therein, and the optical waveguide includes a through hole penetrating in the direction of the thickness of the optical waveguide and in communication with the adhesive receiving groove so that the bonding between the mounting surface and the optical waveguide with the adhesive is achieved by using the adhesive receiving groove and the through hole.

4 Claims, 8 Drawing Sheets

RELATED ART

LENS-EQUIPPED OPTICAL WAVEGUIDE DEVICE FOR TOUCH PANEL AND MANUFACTURING METHOD THEREOF

RELATED APPLICATIONS

This application claims the benefit of U.S. Provisional Application No. 60/951,035, filed on Jul. 20, 2007, which is hereby incorporated by reference.

BACKGROUND OF THE INVENTION

1. Field of the Invention

The present invention relates to a lens-equipped optical waveguide device for a touch panel and a manufacturing method thereof.

2. Description of the Related Art

Touch panels are input devices for operating an apparatus by directly touching a display screen of a liquid crystal display device or the like with a finger, a purpose-built stylus or the like, and include a display which displays operation details and the like, and a detection means which detects the position (coordinates) of a portion of the display screen of the display touched with the finger or the like. Information about the touch position detected by the detection means is sent in the form of a signal to the apparatus, which in turn performs an operation and the like displayed on the touch position. Examples of the apparatus employing such a touch panel include ATMs in banking facilities, ticket vending machines in stations and portable game machines.

A detection means employing an optical waveguide is proposed as the detection means for detecting the finger touch position and the like on the touch panel (see, for example, US 2004/0201579A1). Specifically, the touch panel includes optical waveguides provided around a periphery of a display screen of a rectangular display, and is configured to emit a multiplicity of light beams parallel to the display screen of the display from an optical waveguide provided on one side portion of the display screen toward the other side portion, and to receive the light beams with an optical waveguide provided on the other side portion. The optical waveguides cause the light beams to travel in a lattice on the display screen of the display. When a portion of the display screen of the display is touched with a finger in this state, the finger blocks some of the light beams. Therefore, the optical waveguide which receives the light beams senses a light blocked portion, whereby the position of the portion touched with the finger is detected.

The light beams emitted from an optical waveguide directly into the air diverge radially. In this state, light transmission efficiency is low. To enhance the light transmission efficiency, a lens-equipped optical waveguide device is proposed in which a lens is placed at the front of an optical waveguide which emits light beams to thereby prevent the light beams from diverging, and another lens is similarly placed at the front of an optical waveguide which receives the light beams to thereby cause the light beams in a converged state to enter the optical waveguide. This lens-equipped optical waveguide device is shown in FIGS. 10(a) and (b). In FIGS. 10(a) and (b), the lens-equipped optical waveguide device includes a lens device 20 and an optical waveguide 10. The lens device 20 includes a mounting surface 21 for placing the optical waveguide 10 thereon, and a lens 22 formed to protrude from one edge portion of the mounting surface 21. The optical waveguide 10 is placed on the mounting surface 21 of the lens device 20 and is positioned so that light beams pass through the lens 22. The refraction of the lens 22 is used to prevent the divergence of light beams emitted from the optical waveguide 10 and to converge incident light beams entering a light-receiving optical waveguide 10 in a manner described above.

The manufacture of the above-mentioned lens-equipped optical waveguide device is accomplished by applying an adhesive onto the mounting surface 21 of the lens device 20, placing the optical waveguide 10 on a coating layer 30 of the adhesive to press down the optical waveguides 10, and then hardening the coating layer 30 of the adhesive, thereby bonding and fixing the optical waveguide 10 to the above-mentioned mounting surface 21.

In the above-mentioned lens-equipped optical waveguide device, however, the optical waveguide 10 is placed on the coating layer 30 of the adhesive and pressed down after the adhesive is applied. This causes the adhesive to be squeezed out of a peripheral edge of the optical waveguide 10 to deface a peripheral portion of the optical waveguide 10. Additionally, unevenness in the thickness of the coating layer 30 of the adhesive complicates alignment (in particular, alignment in the heightwise direction) between the optical waveguide 10 and the lens 22.

SUMMARY OF THE INVENTION

In view of the foregoing, it is therefore an object of the present invention to provide a lens-equipped optical waveguide device for a touch panel in which an adhesive is prevented from being squeezed out of a peripheral edge of an optical waveguide and from interfering with alignment between the optical waveguide and a lens, and a method of manufacturing the same.

To accomplish the above-mentioned object, according to a first aspect of the present invention, there is provided a lens-equipped optical waveguide device for a touch panel comprising: an optical waveguide including an under cladding layer and a plurality of cores, the plurality of cores being formed on a surface of the under cladding layer with respective ends arranged in parallel to each other along one edge portion of the under cladding layer; and a lens device having a mounting surface for placing the optical waveguide thereon, and a lens formed in an end portion of the mounting surface, the one edge portion of the under cladding layer having an end surface which is in abutment with the lens of the lens device when the optical waveguide is bonded to the mounting surface of the lens device with an adhesive, wherein the mounting surface of the lens device includes an adhesive receiving groove formed therein, wherein the optical waveguide includes a through hole penetrating in the direction of the thickness of the optical waveguide and in communication with the adhesive receiving groove so that the bonding with the adhesive is achieved by using said adhesive receiving groove and the through hole.

According to a second aspect of the present invention, there is provided a method of manufacturing a lens-equipped optical waveguide device for a touch panel in which an optical waveguide is bonded to a mounting surface of a lens device with an adhesive, the optical waveguide including an under cladding layer and a plurality of cores, the plurality of cores being formed on a surface of the under cladding layer with respective ends arranged in parallel to each other along one edge portion of the under cladding layer, the lens device having the mounting surface for placing the optical waveguide thereon, and a lens formed in an end portion of the mounting surface, the optical waveguide and the lens device being bonded such that an end surface of the one edge portion of the under cladding layer is brought into abutment with the lens of the lens device, the method comprising the steps of: preparing the lens device having the mounting surface including the adhesive receiving groove formed therein; preparing the optical waveguide including the through hole penetrating in the direction of the thickness of the optical waveguide, the through hole being formed to be in communication with the adhesive receiving groove when the optical waveguide is placed on the mounting surface; and placing the optical waveguide on the mounting surface of the lens device with the end surface of the one edge portion of the under cladding layer in abutment with the lens of the lens device and thereafter supplying an adhesive through the through hole of the optical waveguide into the adhesive receiving groove in that state.

The present inventor has made studies to prevent the adhesive from being squeezed out of a peripheral edge of the optical waveguide and from interfering with alignment when the optical waveguide is bonded and fixed to the lens device. In the course of the studies, the present inventor has completely changed the conception of placing the optical waveguide after the adhesive is applied to the mounting surface of the lens device, has conceived the bonding without the formation of a coating layer of the adhesive by the supply of the adhesive to the interface therebetween after the placement of the optical waveguide on the mounting surface of the lens device, and has made further studies. As a result, the present inventor has found that when the adhesive receiving groove is formed in the mounting surface of the lens device and the through hole penetrating in the direction of the thickness of the optical waveguide and in communication with the adhesive receiving groove is formed in the optical waveguide, the supply of the adhesive through the through hole into the adhesive receiving groove after the placement of the optical waveguide on the mounting surface of the lens device prevents the adhesive from being squeezed out of the peripheral edge of the optical waveguide and from giving rise to misalignment to thereby allow the optical waveguide to be properly bonded and fixed to the mounting surface of the lens device. Thus, the present inventor has attained the present invention.

In the lens-equipped optical waveguide device for the touch panel according to the present invention, the adhesive receiving groove is formed in the mounting surface of the lens device, and the through hole penetrating in the direction of the thickness of the optical waveguide and in communication with the adhesive receiving groove is formed in the optical waveguide. Since the bonding of the optical waveguide and the mounting surface of the lens device with the adhesive is achieved by using the adhesive receiving groove and the through hole, the bonding is achieved without previously forming the coating layer of the adhesive. Therefore, the lens-equipped optical waveguide device for the touch panel according to the present invention prevents the adhesive from squeezing out of the peripheral edge of the optical waveguide and accomplishes proper alignment between the optical waveguide and the lens.

The method of manufacturing the lens-equipped optical waveguide device for the touch panel according to the present invention comprises the steps of: preparing the lens device having the mounting surface including the adhesive receiving groove formed therein; preparing the optical waveguide including the through hole penetrating in the direction of the thickness of the optical waveguide, the through hole being in communication with the adhesive receiving groove when the optical waveguide is placed on the mounting surface; and placing the optical waveguide on the mounting surface of the lens device with an end surface of the one edge portion of the under cladding layer in abutment with the lens of the lens device and thereafter supplying an adhesive through the through hole of the optical waveguide into the adhesive receiving groove in that state. Thus, the method achieves the bonding of the optical waveguide to the mounting surface without previously forming a coating layer of the adhesive on the mounting surface. In other words the manufacturing method according to the present invention does not comprise the step of applying the adhesive to the mounting surface of the lens device, so that the coating layer of the adhesive is not formed. Thus, the manufacturing method according to the present invention does not comprise the step of pressing down the optical waveguide against the coating layer of the adhesive, so that the adhesive is not squeezed out of the peripheral edge of the optical waveguide. Additionally, the adhesive is supplied through the through hole into the adhesive receiving groove, with the optical waveguide aligned with the mounting surface of the lens device. This eliminates a misalignment resulting from the unevenness in the thickness of the coating layer of the adhesive.

DESCRIPTION OF THE PREFERRED EMBODIMENTS

A preferred embodiment according to the present invention will now be described in detail with reference to the drawings.

Figure 1:
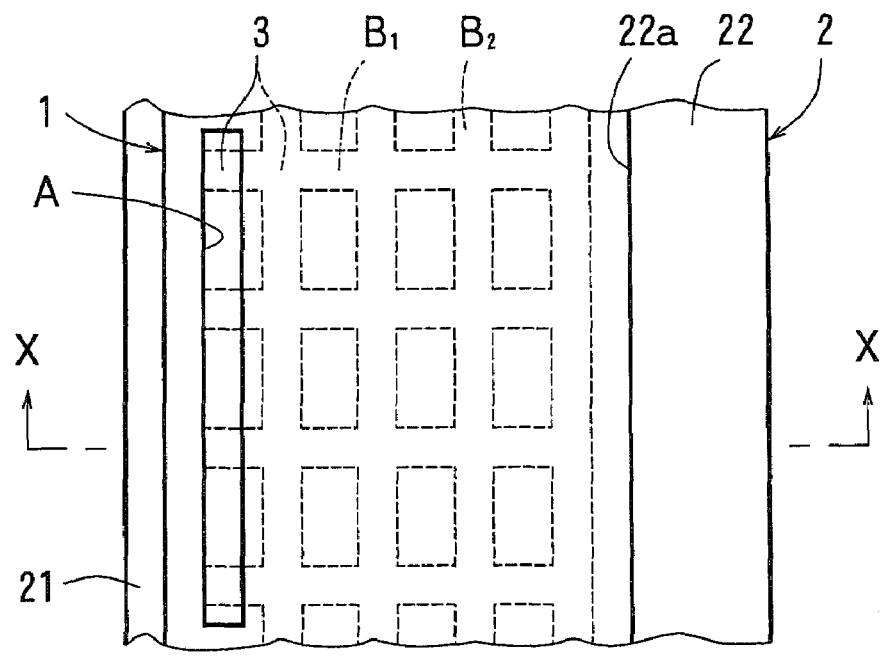
FIGS. 1(a) and 1(b) are a plan view and a sectional view taken along the line X-X of FIG. 1(a), respectively, schematically illustrating one preferred embodiment of a lens-equipped optical waveguide device for a touch panel according to the present invention.
Figure 1:
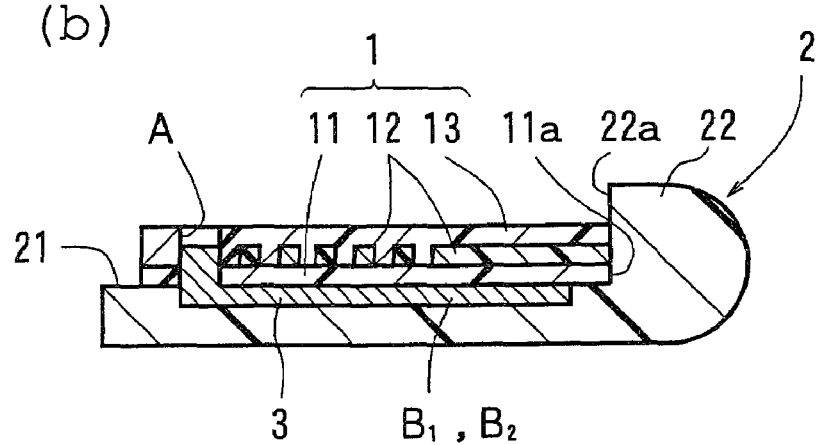

FIGS. 1(a) and 1(b) illustrate a lens-equipped optical waveguide device for a touch panel according to one preferred embodiment of the present invention. The lens-equipped optical waveguide device for a touch panel according to this embodiment includes a strip-shaped lens device 2, and a strip-shaped optical waveguide 1 placed on the lens device 2. The strip-shaped lens device 2 has a lens 22 having a curved lens surface on one side of the lens device 2 along the length thereof (the right-hand side in the figures), and a mounting surface 21 formed on the other side (the left-hand side in the figures) of the lens device 2. The strip-shaped optical waveguide 1 is placed on the mounting surface 21 along the length of the lens device 2. A plurality of adhesive receiving grooves $B_1$ and $B_2$ extending in the transverse and longitudinal directions of the lens device 2 are formed in the mounting surface 21 of the lens device 2 to define lattice-shaped grooves. On the other hand, a through hole A penetrating in the direction of the thickness of the optical waveguide 1 is formed in a strip-shape in plan view and in communication with the transverse adhesive receiving grooves $B_1$. The optical waveguide 1 is bonded to the mounting surface 21 of the lens device 2 with an adhesive 3 which is supplied through the through hole A, with the optical waveguide 1 precisely positioned relative to the mounting surface 21 of the lens device 2, so as to fill the adhesive receiving grooves $B_1$ and the adhesive receiving grooves $B_2$ intersecting the adhesive receiving grooves $B_1$ with the adhesive 3. This maintains the precise positioning of the optical waveguide 1 and the lens device 2 relative to each other. Thus, an end surface 11a of an under cladding layer 11 is in proper intimate contact with an abutting surface 22a which is formed on the mounting surface side of the lens 22. In this embodiment, an end surface of each core 12 and an end surface of an over cladding layer 13 are also in proper intimate contact with the abutting surface 22a of the lens 22. The cores 12 are not shown in FIG. 1(a). In FIG. 1(b), an abbreviated number of cores 12 are shown. Similar considerations apply to the subsequent figures.

Figure 2:
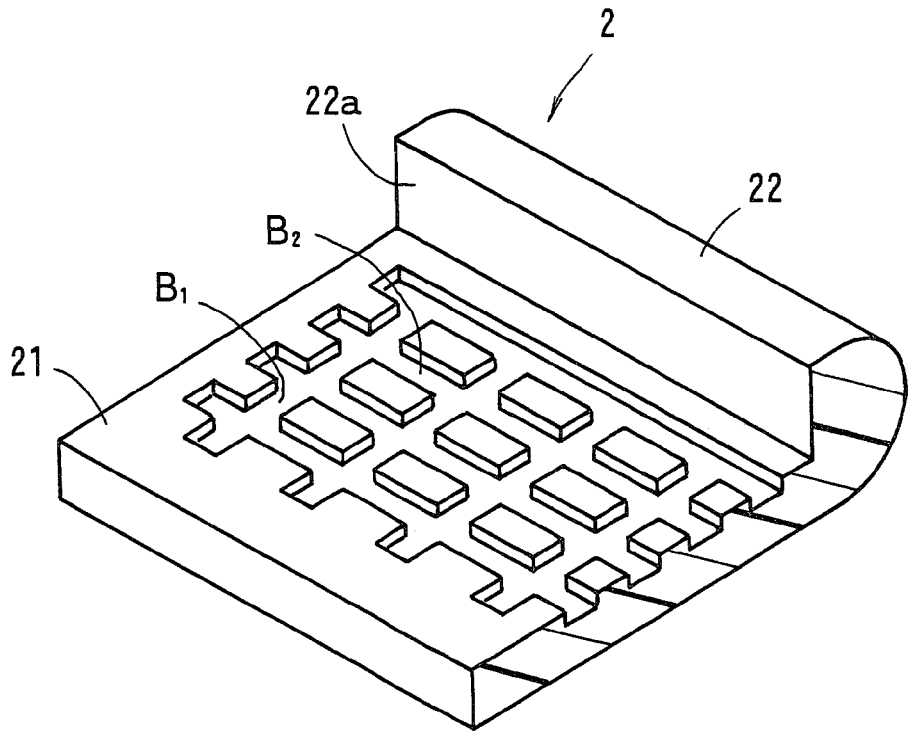
FIG. 2 is a perspective view schematically illustrating a major portion of a lens device constituting the lens-equipped optical waveguide device for a touch panel.

More specifically, the mounting surface 21 of the lens device 2 is formed with the plurality of transverse adhesive receiving grooves $B_1$ and the plurality of longitudinal adhesive receiving grooves $B_2$ intersecting the transverse adhesive receiving grooves $B_1$, as shown in FIG. 2. The ends of the adhesive receiving grooves $B_1$ and $B_2$ are closed to prevent the adhesive 3 from squeezing out. The lens 22 of the lens device 2 has the abutting surface 22a which is formed on the side of the mounting surface 21 as a wall surface substantially perpendicular to the mounting surface for abutment with the end surface 11a (see FIG. 3) of the under cladding layer 11.

Figure 3:
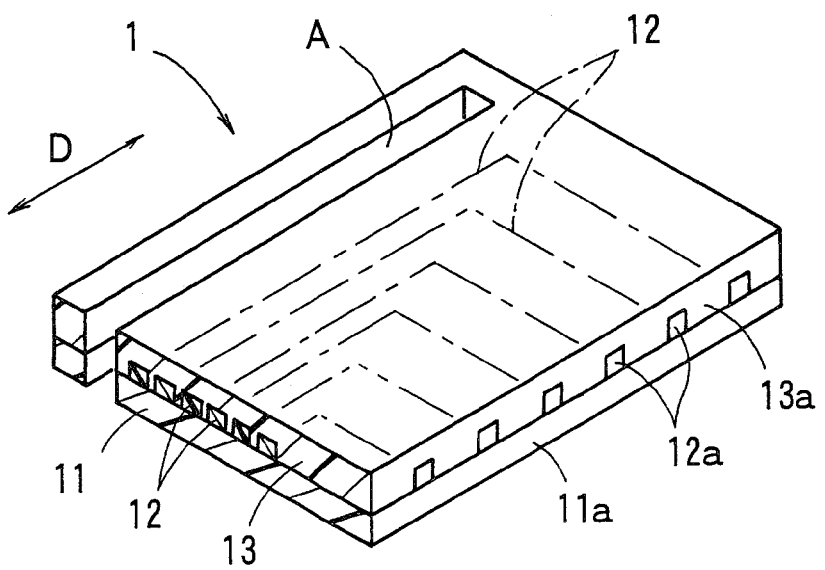
FIG. 3 is a perspective view schematically illustrating a major portion of an optical waveguide constituting the lens-equipped optical waveguide device for a touch panel.

In the optical waveguide 1, as shown in FIG. 3, the plurality of cores 12 are formed on the surface of the under cladding layer 11 and arranged in a parallel, predetermined spaced relationship along the length of the under cladding layer 11 (or in the direction shown with arrow D). The cores 12 are bent on one end side thereof at right angles as indicated by dash-and-dot lines in the figure (the thickness of the dash-and-dot lines indicates the thickness of cores 3), have end surfaces 12a at one end thereof exposed to the outside in a parallel, and have predetermined spaced relationship along one edge portion on the surface of the under cladding layer 11. The cores 12 on the other end side thereof are covered with the over cladding layer 13, and extend to one longitudinal end of the under cladding layer 11 along the length of the under cladding layer 11. In this embodiment, the end surfaces 12a of the cores 12 and an end surface 13a of the over cladding layer 13 which correspond to the end surface 11a of the one edge portion of the under cladding layer 11 are flush with each other. The other side edge portion along the length of the optical waveguide 1 (on the left-hand side of the figure) is formed with the through hole A having a strip-shape in plan view extending in the longitudinal direction of the optical waveguide 1. The through hole A is formed at a position for communication with the transverse adhesive receiving grooves $B_1$ formed in the mounting surface 21 of the lens device 2 (see FIG. 2).

Figure 4:
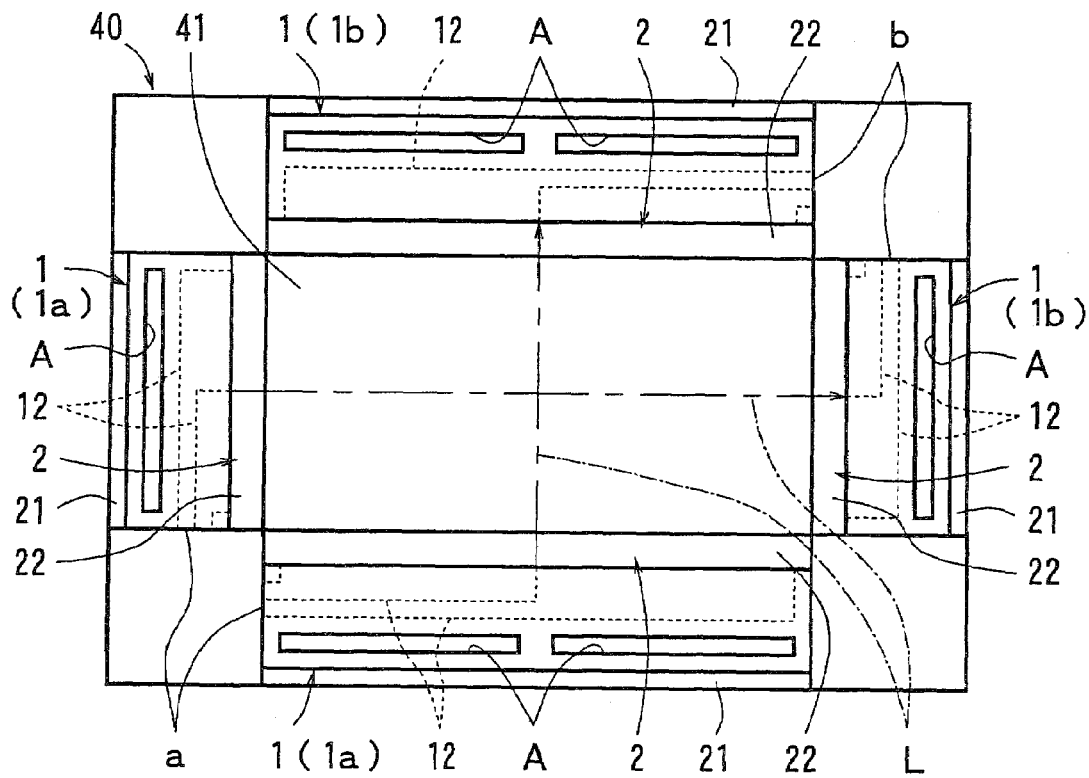
FIGS. 4 (a) and 4(b) are a plan view and a sectional view, respectively, schematically illustrating a touch panel which employs the lens-equipped optical waveguide device for a touch panel.
Figure 4:
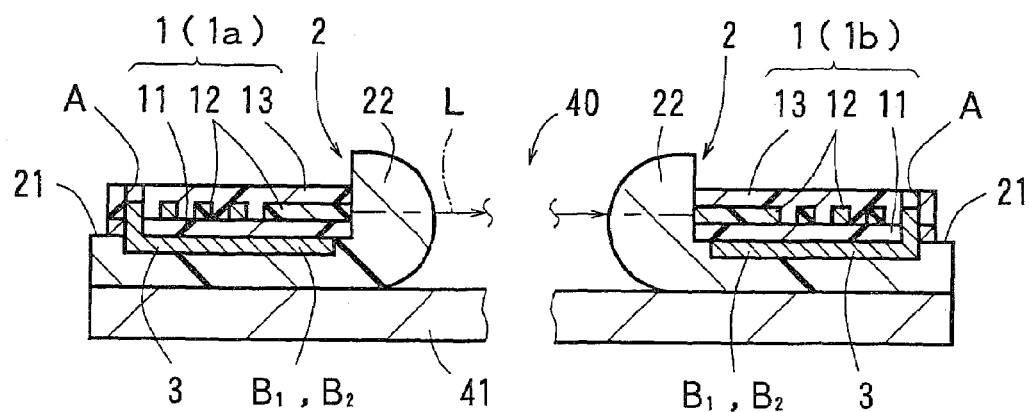

The strip-shaped lens-equipped optical waveguide device for the touch panel [see FIGS. 1(a) and 1(b)] which is formed by bonding the optical waveguide 1 to the lens device 2 is provided on each side of a rectangular display screen of a display 41 of a touch panel 40, with the lens 22 positioned inside, so that two pairs of lens-equipped optical waveguide devices are opposed to each other, respectively, as shown in FIGS. 4(a) and 4(b). One of each pair of the opposing optical waveguides 1 is an optical waveguide 1a which emits light beams L as indicated by the arrows shown, and a light source (not shown) is connected to the cores 12 in the one end portion a (the lower left portion in the figure) of the strip-shaped configuration of the optical waveguide 1a. The other of each pair of the opposing optical waveguides 1 is an optical waveguide 1b which receives the emitted light beams L, and a detector (not shown) is connected to the cores 12 in the one end portion b (the upper right portion in the figure) of the strip-shaped configuration of the optical waveguide 1b. In FIG. 4(a), the cores 12 are indicated by dash-and-dot lines, and the thickness of the dash-and-dot lines indicates the thickness of the cores 12.

In the lens-equipped optical waveguide device for the touch panel, the light beams L emitted from the ends of the cores 12 of the optical waveguide 1a are prevented from diverging by the refraction of the lens 22 of the lens device 2, and travel in that state along the display screen of the display 41. The incident light beams L, on the other hand, are changed into converged light beams L by the refraction of the lens 22 of the lens device 2, and the converged light beams L enter the cores 12 of the optical waveguide 1b.

The dimensions of the lens-equipped optical waveguide device for the touch panel may be determined to conform to the size and the like of the display 41 of the touch panel 40, and are not particularly limited. For example, the dimensions of the strip-shaped lens device 2 are on the order of 40 mm to 500 mm in length, and on the order of 1.5 mm to 100 mm in width; the thickness (height) of a portion of the lens device 2 corresponding to the mounting surface 21 is on the order of 0.1 mm to 5 mm; the width thereof is on the order of 1.5 mm to 80 mm; the thickness (height) of a portion of the lens device 2 corresponding to the lens 22 is on the order of 0.5 mm to 10 mm; and the width thereof is on the order of 0.1 mm to 20 mm. The dimensions of the adhesive receiving grooves $B_1$ and $B_2$ are 10 μm to 500 μm in width, and 10 μm to 1000 μm in depth. The length of the adhesive receiving grooves $B_1$ extending in the transverse direction of the lens device 2 depends on the width of the mounting surface 21, and the length of the adhesive receiving grooves $B_2$ extending in the longitudinal direction of the lens device 2 depends on the length of the lens device 2. The number of adhesive receiving grooves $B_1$ and $B_2$ depends on the dimensions of the mounting surface 21. The dimensions of the strip-shaped optical waveguide 1 are on the order of 40 mm to 500 mm in length, and on the order of 1 mm to 40 mm in width. The dimensions of the through hole A are as follows: the width thereof is on the order to 100 μm to 10 mm; the depth thereof is identical with the thickness of the optical waveguide 1; and the length thereof depends on the length of the optical waveguide 1. The number of light emitting (light receiving) cores 12 may be determined according to the number of operation details to be displayed on the display screen of the display 41, and is not particularly limited. For example, on the order of 50 to 3000 cores 12 are provided for each strip-shaped optical waveguide.

Next, an exemplary manufacturing method of the lens-equipped optical waveguide device for the touch panel according to the present invention will be described. In this manufacturing method, the optical waveguide 1 and the lens device 2 are produced separately and thereafter bonded together, which will be described in detail below.

Figure 5:
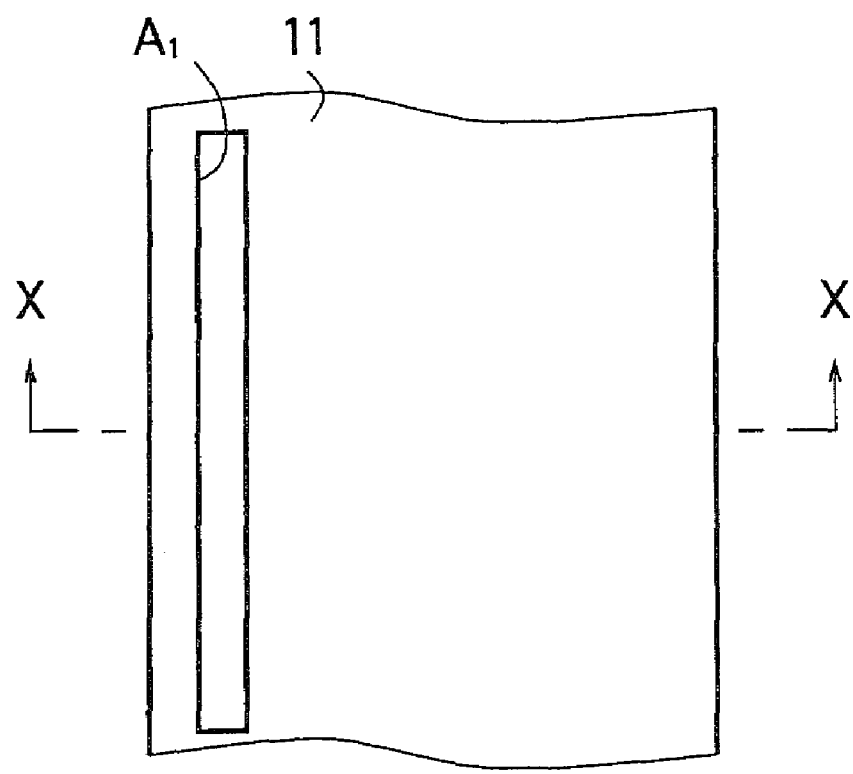
FIGS. 5(a) and 5(b) are a plan view and a sectional view taken along the line X-X of FIG. 5(a), respectively, schematically illustrating a manufacturing method of the lens-equipped optical waveguide device for a touch panel.
Figure 5:
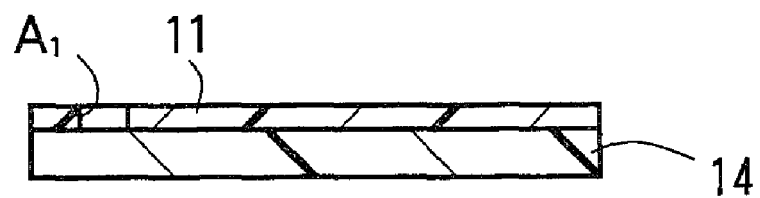

For the production of the above-mentioned optical waveguide 1, a base 14 of a flat shape is first prepared, as shown in FIGS. 5(a) and 5(b). A material for the formation of the base 14 is not particularly limited. Examples of the materials include resins, glass, silicone and metals. Examples of the resins include polyethylene naphthalates, polypropylenes, polyethylenes, polyesters, polyacrylates, polycarbonates, polynorbornenes and polyimides. The thickness of the base 14 is not particularly limited. The thickness may be typically set within a range of 20 μm (for a film-like base 14) to 5 mm (for a plate-like base 14).

Next, the under cladding layer 11 having a through hole $A_1$ corresponding to the through hole A (constituting a part of the through hole A) of a strip-shape in plan view (see FIG. 3) is formed on a predetermined region of a surface of the base 14. Examples of a material for the formation of the under cladding layer 11 include photosensitive resins, polyimide resins and epoxy resins. For the formation of the under cladding layer 11, a varnish prepared by dissolving the resin in a solvent is first applied onto the base 14. The application of the varnish is achieved, for example, by a spin coating method, a dipping method, a casting method, an injection method or an ink jet method. Next, the varnish is hardened. For this hardening, the material for the formation of the under cladding layer 11 is exposed to radiation through a photomask formed with an opening pattern corresponding to a desired shape of the under cladding layer 11 (a shape in which the through hole $A_1$ is formed) when a photosensitive resin is used as the material for the formation of the under cladding layer 11. An exposed portion will later serve as the under cladding layer 11. Alternatively, the material for the formation of the under cladding layer 11 is generally hardened by a heat treatment at 300° C. to 400° C. for 60 to 180 minutes, and then a portion corresponding to the through hole $A_1$ is cut using a laser, a drill and the like where a polyimide resin is used as the material for the formation of the under cladding layer 11. The thickness of the under cladding layer 11 is generally in the range of 5 μm to 50 μm. In this manner, the under cladding layer 11 formed with the through hole $A_1$ is produced.

Figure 6:
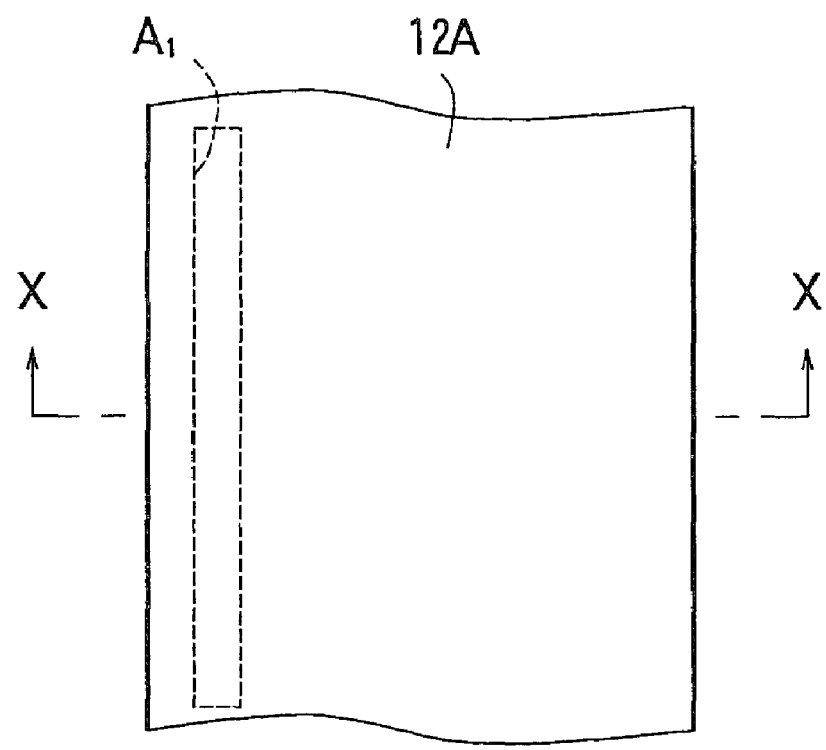
FIGS. 6(a) and 6(b) are a plan view and a sectional view taken along the line X-X of FIG. 6(a), respectively, schematically illustrating the manufacturing method of the lens-equipped optical waveguide device for a touch panel.
Figure 6:
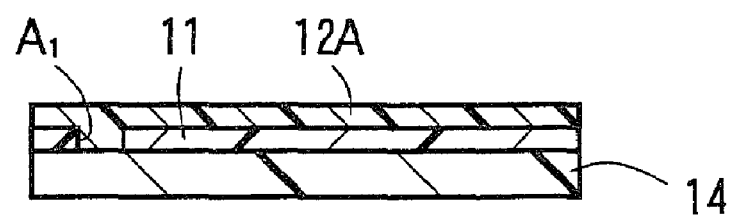

Next, as shown in FIGS. 6(a) and 6(b), a resin layer 12A which will later be formed into the cores 12 [see FIGS. 7(a) and 7(b)] by subsequent selective exposure is formed over the surface (including the through hole $A_1$) of the under cladding layer 11. An exemplary material for the formation of the resin layer 12A is a photosensitive resin. The material for the formation of the resin layer 12A used herein is a material having a refractive index greater than that of the materials for the formation of the under cladding layer 11 and the over cladding layer 13 [see FIGS. 8(a) and 8(b)] to be described later. The refractive index may be adjusted, for example, by properly selecting the types of the materials or adjusting the composition ratio thereof for the formation of the under cladding layer 11, the cores 12 and the over cladding layer 13. The method for the formation of the resin layer 12A is not particularly limited. The formation may be accomplished in the same manner as the under cladding layer 11 described above, for example, by applying a varnish prepared by dissolving the photosensitive resin in a solvent onto the under cladding layer 11, and then drying the varnish. The application of the varnish is achieved in the same manner as the under cladding layer 11 described above, for example, by a spin coating method, a dipping method, a casting method, an injection method or an ink jet method. The drying is achieved by a heat treatment at 50° C. to 120° C. for 10 to 30 minutes.

Figure 7:
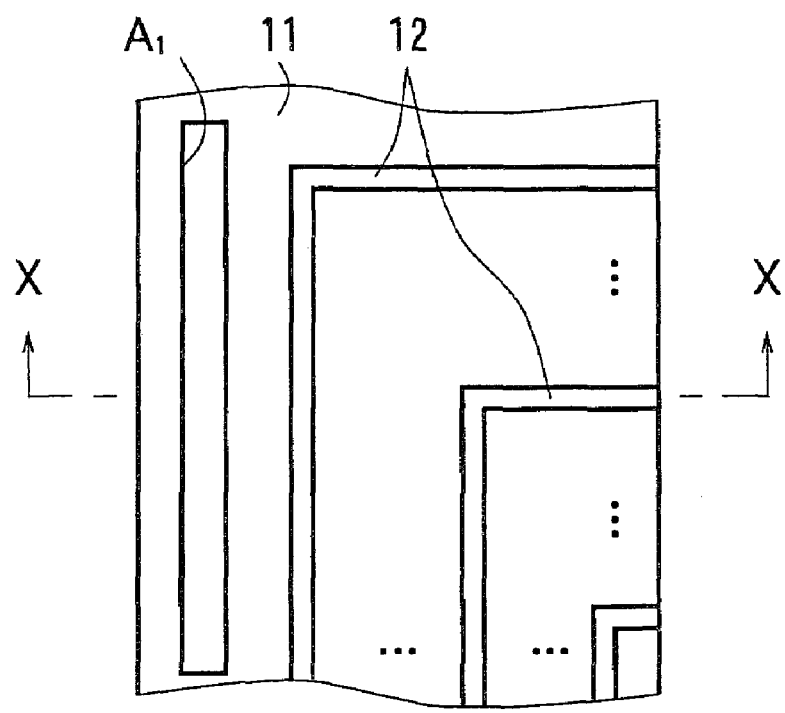
FIGS. 7(a) and 7(b) are a plan view and a sectional view taken along the line X-X of FIG. 7(a), respectively, schematically illustrating the manufacturing method of the lens-equipped optical waveguide device for a touch panel.
Figure 7:
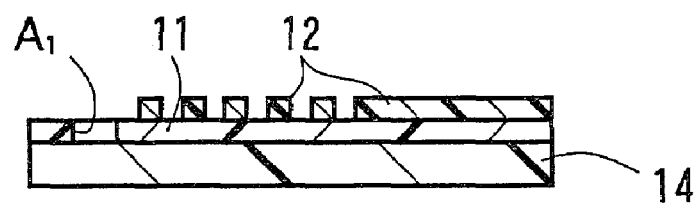

Then, the resin layer 12A is exposed to radiation through a photomask formed with an opening pattern corresponding to a desired pattern of the cores 12 [see FIGS. 7(a) and 7(b)]. Exposed portions will later serve as the cores 12. Examples of the radiation for exposure used herein include visible light, ultraviolet radiation, infrared radiation, X-rays, alpha rays, beta rays and gamma rays. Preferably, ultraviolet radiation is used, since the use of ultraviolet radiation achieves irradiation with large energy to provide a high rate of hardening, and an irradiation apparatus therefor is small in size and inexpensive to achieve the reduction in production costs. A light source of the ultraviolet radiation may be, for example, a low-pressure mercury-vapor lamp, a high-pressure mercury-vapor lamp or an ultra-high-pressure mercury-vapor lamp. The dose of the ultraviolet radiation is generally 10 mJ/cm$^2$ to 10000 mJ/cm$^2$, preferably 50 mJ/cm$^2$ to 3000 mJ/cm$^2$.

After the exposure, a heat treatment is performed to complete a photoreaction. This heating treatment is performed at 80° C. to 250° C., preferably at 100° C. to 200° C., for 10 seconds to two hours, preferably for five minutes to one hour. Thereafter, development is performed using a developing solution to dissolve away an unexposed portion of the resin layer 12A, thereby patterning the resin layer 12A [see FIGS. 7(a) and 7(b)]. At this time, a portion of the resin layer 12A which fills the through hole $A_1$ of the under cladding layer 11 is also dissolved away to uncover the through hole $A_1$. Then, the developing solution remaining after the development is removed by a heat treatment, whereby the pattern of the cores 12 is formed as shown in FIGS. 7(a) and 7(b). The heat treatment is typically performed at 60° C. to 120° C. for 10 to 30 minutes. In general, the thickness of each core 12 is in the range of 10 μm to 70 μm, and the width thereof is in the range of 5 μm to 30 μm. A tip of each core 12 is preferably formed in a lens-shaped configuration from the viewpoint of further improving optical transmission efficiency by preventing the divergence of light beams emitted from the tip of each core 12 and by converging light beams incident on the tip of each core 12. Exemplary methods to be employed for the development include an immersion method, a spray method and a puddle method. Examples of the developing solution used herein include an organic solvent and an organic solvent containing an alkaline aqueous solution. The developing solution and conditions for the development are selected as appropriate depending on the composition of a photosensitive resin composition.

Figure 8:
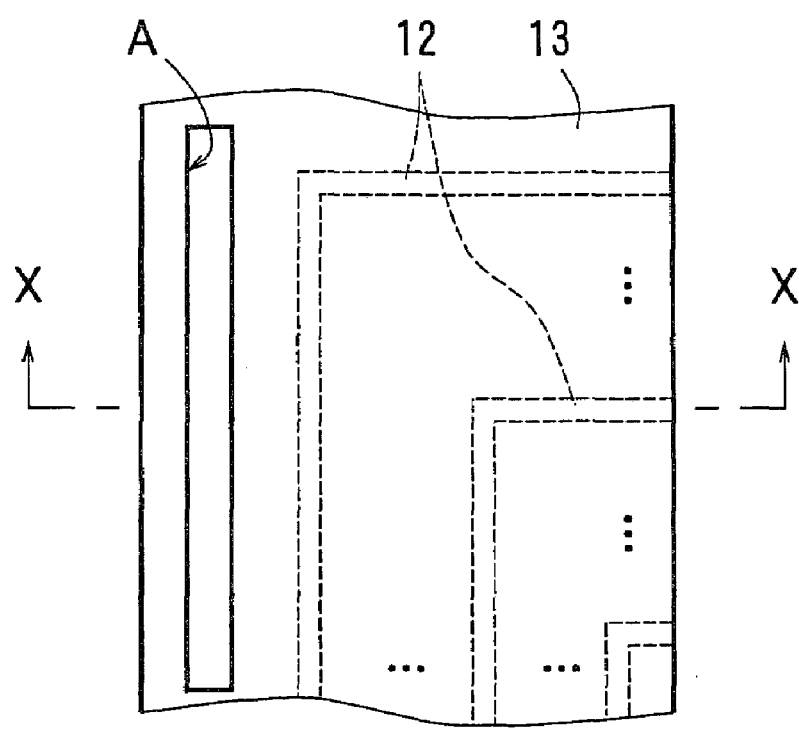
FIGS. 8(a) and 8(b) are a plan view and a sectional view taken along the line X-X of FIG. 8(a), respectively, schematically illustrating the manufacturing method of the lens-equipped optical waveguide device for a touch panel.
Figure 8:
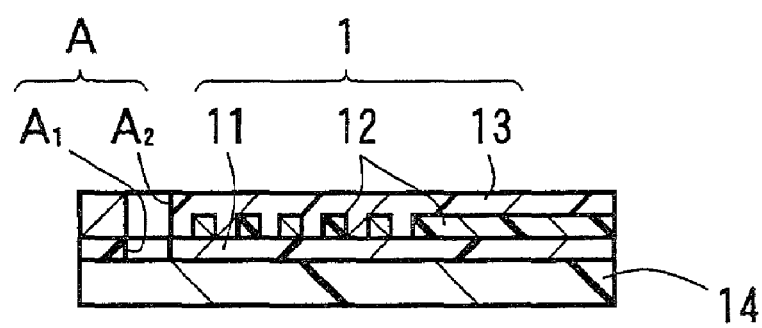

Next, as shown in FIGS. 8(a) and 8(b), the over cladding layer 13 is formed on the under cladding layer 11. Exemplary materials for the formation of the over cladding layer 13 are the same as those employed for the formation of the under cladding layer 11. The material for the formation of the over cladding layer 13 may be the same as or different from the material for the formation of the under cladding layer 11. The method for the formation of the over cladding layer 13 includes performing selective exposure using a photomask, forming a through hole $A_2$ on the through hole $A_1$ of the under cladding layer 11 in a manner similar to the method for the formation of the under cladding layer 11 so as to form the through hole A from the through holes $A_1$ and $A_2$. The thickness of the over cladding layer 13 is typically in the range of 20 μm to 100 μm.

Subsequently, the base 14 is removed from the under cladding layer 11. The base 14 and the under cladding layer 11 are bonded to each other with a smaller adhesive force because of their formation materials and, therefore, can be readily removed from each other by pulling the base 14 and the over cladding layer 13 by air suction. Thus, the optical waveguide 1 having the through hole A penetrating in the direction of the thickness of the optical waveguide is obtained.

The lens device 2 (see FIG. 2) is produced by die-molding of resin, in which the mounting surface 21, the lens 22, and the adhesive receiving grooves $B_1$ and $B_2$ are formed. Examples of the resin include polycarbonates, epoxy resins and acrylic resins.

Figure 9:
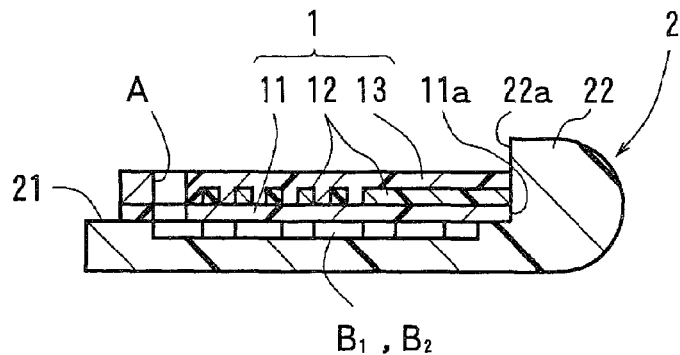
FIG. 9 is a sectional view schematically illustrating the manufacturing method of the lens-equipped optical waveguide device for a touch panel.

Then, as shown in FIG. 9, the optical waveguide 1 is precisely positioned relative to the mounting surface 21 of the lens device 2 thus obtained, and the end surface 11a of the under cladding layer 11 is brought into intimate contact with the abutting surface 22a of the lens device 2. At this time, the through hole A precisely communicates with the transverse adhesive receiving grooves $B_1$. In this state, the adhesive 3 [see FIGS. 1(a) and 1(b)] is supplied through the through hole A of the optical waveguide 1 to fill the transverse adhesive receiving grooves $B_1$ and the longitudinal adhesive receiving grooves $B_2$ with the adhesive 3, thereby bonding the lens device 2 and the optical waveguide 1 together while the precise positioning thereof is maintained. Where an ultraviolet curable adhesive is used as the adhesive 3, the bonding is accomplished by irradiation with ultraviolet radiation through the optical waveguide 1 after the adhesive 3 is supplied. In this manner, the lens-equipped optical waveguide device for the touch panel according to the present invention [see FIGS. 1(a) and 1(b)] is manufactured.

The foregoing manufacturing method eliminates the need to press down the optical waveguide 1 after the application of the adhesive 3 to the mounting surface 21. Therefore, in the manufactured lens-equipped optical waveguide device for the touch panel, the adhesive 3 is prevented from being squeezed out of a peripheral edge of the optical waveguide 1.

Figure 10:
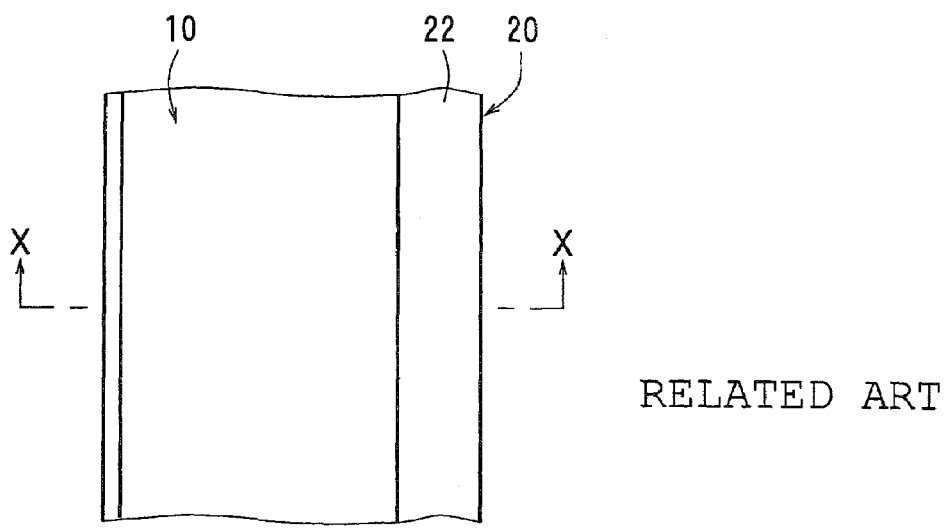
FIGS. 10(a) and 10(b) are a plan view and a sectional view taken along the line X-X of FIG. 10(a), respectively, schematically illustrating a lens-equipped optical waveguide device for a touch panel of related art.
Figure 10:
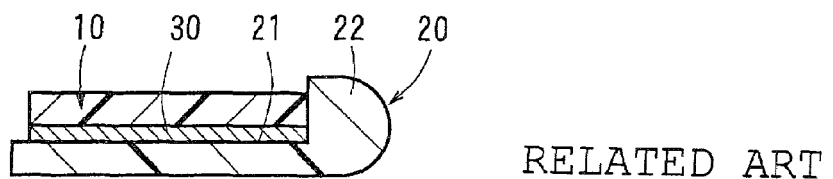

Further, the adhesive receiving groves $B_1$ and $B_2$ are filled with the adhesive 3, with the optical waveguide 1 precisely positioned relative to the mounting surface 21. This eliminates a misalignment resulting from unevenness in the thickness of a coating layer 30 [see FIG. 10(b)] of the adhesive 3.

In the above-mentioned preferred embodiment, the adhesive receiving grooves $B_1$ and $B_2$ are formed so as to intersect the transverse direction and the longitudinal direction of the lens device 2. The formation of the adhesive receiving grooves $B_1$ and $B_2$ is not limited to this, for example, the adhesive receiving groove may consists only of the transverse adhesive receiving grooves $B_1$. Additionally, the transverse adhesive receiving grooves $B_1$ need not be of a linear configuration but may be of a random configuration as long as the transverse adhesive receiving grooves $B_1$ extend in the transverse direction.

In the above embodiment, the ends of the adhesive receiving grooves $B_1$ and $B_2$ are closed to prevent the adhesive 3 from squeezing out. However, a through hole for air vent may be formed in the closed portions or formed to extend in the direction of the thickness of the optical waveguide 1 for easily releasing air out of the adhesive receiving grooves $B_1$ and $B_2$ during the supply of the adhesive 3.

The size, configuration and number of throughholes A formed in the optical waveguide 1 for the supply of the adhesive are not particularly limited as long as the through holes A are in communication with the adhesive receiving grooves $B_1$ and $B_2$ of the lens device 2. Furthermore, although the over cladding layer 13 is formed in the embodiment, the over cladding layer 13 is not essential and may be dispensed with for the formation of the optical waveguide in some instances.

In the above-mentioned preferred embodiment, the configuration of the optical waveguides 1 is a strip-shaped configuration, and the optical waveguides 1 are provided on the respective sides of the rectangular shape of the display screen of the display 41 to collectively provide a frame-shaped configuration. However, the configuration of the optical waveguides 1 is not limited to this. The optical waveguides 1 may be integrated together into a rectangular frame-shaped configuration. Alternatively, two L-shaped optical waveguide 1 may be opposed to each other to form a rectangular frame-shaped configuration. The frame-shaped configuration may be other configurations, for example, a polygonal configuration such as a hexagon or a circular configuration.

Next, an example of the present invention will be described. It should be noted that the present invention is not limited to the inventive example.

EXAMPLE 1

Material for Formation of Under Cladding Layer and over Cladding Layer

A material for formation of an under cladding layer and an over cladding layer was prepared by mixing 35 parts by weight of bisphenoxyethanolfluorene glycidyl ether (component A) represented by the following general formula (1), 40 parts by weight of 3',4'-Epoxycyclohexylmethyl-3,4-Epoxycyclohexane carboxylate which is an alicyclic epoxy (CELLOXIDE 2021P manufactured by Daicel Chemical Industries, Ltd.) (component B), 25 parts by weight of an alicyclic epoxy resin having a cyclohexene oxide skeleton (CELLOXIDE 2081 manufactured by Daicel Chemical Industries, Ltd.) (component C), and 2 parts by weight of a 50% propione carbonate solution of 4,4'-bis[di($\beta$-hydroxyethoxy)phenylsulfinio]phenylsulfide bishexafluoroantimonate (component D).

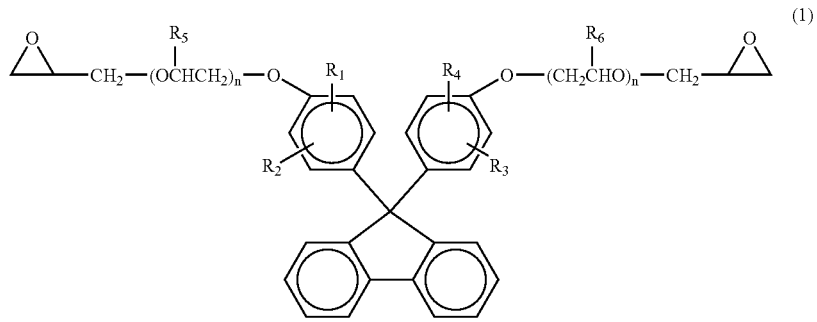

wherein R1 to R6 are hydrogen atoms, and n=1.

Material for Formation of Cores

A material for formation of cores was prepared by dissolving 70 parts by weight of the aforementioned component A, 30 parts by weight of 1,3,3-tris{4-[2-(3-oxetanyl)]butoxyphenyl}butane and one part by weight of the aforementioned component D in ethyl lactate.

Production of Optical Waveguide

The material for the formation of the under cladding layer was applied onto a surface of a polyethylene naphthalate base [160 mm×160 mm×188 μm (thickness)] by a spin coating method. Thereafter, exposure to ultraviolet radiation at 2000 mJ/cm$^2$ was performed through a photomask formed with an opening pattern identical in shape with the under cladding layer to be formed (formed with a through hole for the supply of an adhesive). Subsequently, a heat treatment was performed at 100° C. for 15 minutes to form the under cladding layer. The thickness of the under cladding layer was 30 μm when measured with a contact-type film thickness meter. The dimensions of the formed through hole were 50 mm×1.5 mm×30 μm (thickness of the optical waveguide). The refractive index of this under cladding layer at a wavelength of 830 nm was 1.542.

Next, the material for the formation of the cores was applied onto the surface of the under cladding layer by a spin coating method. Thereafter, a drying process was performed at 100° C. for 15 minutes. Next, a synthetic quartz chromium mask (photomask) formed with an opening pattern identical in shape with a core pattern to be formed was placed on the resulting core material. Then, exposure to ultraviolet radiation at 4000 mJ/cm$^2$ was performed by a contact exposure method from above the photomask. Thereafter, a heat treatment was performed at 120° C. for 15 minutes. Next, development was carried out using an aqueous solution of γ-butyrolactone to dissolve away an unexposed portion. Thereafter, a heat treatment was performed at 120° C. for 30 minutes to form the cores. The dimensions of each of thus formed core in cross section were 12 μm in width×24 μm in height when measured with an SEM. The refractive index of the cores at a wavelength of 830 nm was 1.602.

Next, the material for the formation of the over cladding layer was applied by a spin coating method to cover the cores. Then, exposure to ultraviolet radiation at 2000 mJ/cm$^2$ was performed through a photomask formed with an opening pattern identical in shape with the over cladding layer to be formed (formed with a through hole for the supply of an adhesive). Subsequently, a heat treatment was performed at 150° C. for 60 minutes, whereby the over cladding layer was formed. The thickness of the over cladding layer (a thickness as measured from the surface of the under cladding layer) was 60 μm when measured with a contact-type film thickness meter. The refractive index of the over cladding layer at a wavelength of 830 nm was 1.542.

Then, the polyethylene naphthalate base was removed from the under cladding layer. Thus, an optical waveguide including the under cladding layer, the cores and the over cladding layer formed with the through hole penetrating in the direction of the thickness of the optical waveguide was obtained.

Production of Lens Device

A lens device formed with a mounting surface, a lens and adhesive receiving grooves (three transverse adhesive receiving grooves and four longitudinal adhesive receiving grooves) was produced by die-molding using an epoxy resin as a material. The dimensions of each transverse adhesive receiving groove were 1 mm in width and 0.3 mm in depth. The spacing between adjacent ones of the transverse adhesive receiving grooves was 5 mm. The dimensions of each longitudinal adhesive receiving groove were 1.5 mm in width and 0.3 mm in depth. The spacing between adjacent ones of the longitudinal adhesive receiving grooves was 7.5 mm.

Production of Lens-Equipped Optical Waveguide Device for Touch Panel

The optical waveguide was precisely positioned relative to the mounting surface of the above-mentioned lens device, and an end surface of the under cladding layer was brought into intimate contact with the lens device. In this state, an ultraviolet curable adhesive was poured through the through hole of the optical waveguide to fill the entire adhesive receiving grooves of the lens device with the adhesive. Thereafter, the optical waveguide was bonded and fixed to the mounting surface of the lens device by irradiation with ultraviolet radiation through the optical waveguide. In this manner, a lens-equipped optical waveguide device for a touch panel was produced.

The ultraviolet curable adhesive did not squeeze out of a peripheral edge of the optical waveguide in the production of the lens-equipped optical waveguide device for the touch panel. Additionally, there was no unevenness in the thickness of the ultraviolet curable adhesive, and precise positioning was achieved.

Although a specific form of embodiment of the instant invention has been described above and illustrated in the accompanying drawings in order to be more clearly understood, the above description is made by way of example and not as a limitation to the scope of the instant invention. It is contemplated that various modifications apparent to one of ordinary skill in the art could be made without departing from the scope of the invention which is to be determined by the following claims.

What is claimed is:

1. A lens-equipped optical waveguide device for a touch panel comprising: an optical waveguide including an under cladding layer and a plurality of cores, said plurality of cores being formed on a surface of the under cladding layer with respective ends arranged in parallel to each other along one edge portion of said under cladding layer; and a lens device having a mounting surface for placing the optical waveguide thereon and a lens formed in an end portion of the mounting surface, wherein the one edge portion of the under cladding layer has an end surface which is in abutment with the lens of said lens device when said optical waveguide is bonded to the mounting surface of the lens device with an adhesive, wherein the mounting surface of said lens device includes an adhesive receiving groove formed therein, and wherein said optical waveguide includes a through hole penetrating in the direction of the thickness of the optical waveguide and in communication with said adhesive receiving groove so that the bonding with said adhesive is achieved by using said adhesive receiving groove and the through hole.

2. The lens-equipped optical waveguide device for a touch panel according to claim 1, wherein said adhesive receiving groove extends from a portion corresponding to said through hole toward the lens.

3. The lens-equipped optical waveguide device for a touch panel according to claim 2, further comprising a second adhesive receiving groove intersecting said adhesive receiving groove.

4. A method of manufacturing a lens-equipped optical waveguide device for a touch panel in which an optical waveguide is bonded to a mounting surface of a lens device with an adhesive, said optical waveguide including an under cladding layer and a plurality of cores, the plurality of cores being formed on a surface of the under cladding layer with respective ends arranged in parallel to each other along one edge portion of said under cladding layer, said lens device comprising the mounting surface for placing the optical waveguide thereon and a lens formed in an end portion of the mounting surface, the optical waveguide and the lens device being bonded such that an end surface of the one edge portion of said under cladding layer is in abutment with the lens of said lens device, said method comprising the steps of: preparing said lens device having the mounting surface including an adhesive receiving groove formed therein; preparing said optical waveguide including a through hole penetrating in the direction of the thickness of the optical waveguide, said through hole being formed to be in communication with said adhesive receiving groove when the optical waveguide is placed on said mounting surface; and placing said optical waveguide on the mounting surface of said lens device with the end surface of said one edge portion of the under cladding layer in abutment with the lens of said lens device and thereafter supplying an adhesive through the through hole of said optical waveguide into said adhesive receiving groove in that placed state.

* * * * *